US009915204B2

(12) United States Patent
Suciu et al.

(10) Patent No.: US 9,915,204 B2
(45) Date of Patent: *Mar. 13, 2018

(54) SYSTEMS AND METHODS FOR DISTRIBUTING COOLING AIR IN GAS TURBINE ENGINES

(71) Applicant: United Technologies Corporation, Hartford, CT (US)

(72) Inventors: Gabriel L. Suciu, Glastonbury, CT (US); Brian D. Merry, Andover, CT (US); James D. Hill, Tolland, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 333 days.

This patent is subject to a terminal disclaimer.

(21) Appl. No.: 14/676,513

(22) Filed: Apr. 1, 2015

(65) Prior Publication Data

US 2015/0369130 A1    Dec. 24, 2015

Related U.S. Application Data

(60) Provisional application No. 62/014,335, filed on Jun. 19, 2014.

(51) Int. Cl.
| | | |
|---|---|---|
| *F01D 5/08* | (2006.01) | |
| *F02C 7/18* | (2006.01) | |
| *F01D 11/00* | (2006.01) | |
| *F01D 25/24* | (2006.01) | |

(52) U.S. Cl.
CPC ............... *F02C 7/18* (2013.01); *F01D 5/088* (2013.01); *F01D 11/001* (2013.01); *F01D 25/24* (2013.01)

(58) Field of Classification Search
CPC .......... F02C 7/18; F01D 25/24; F01D 11/001; F01D 5/088; F01D 11/005; F01D 11/006; F01D 11/008
See application file for complete search history.

(56) References Cited

U.S. PATENT DOCUMENTS

| | | | |
|---|---|---|---|
| 2,988,325 A | 6/1961 | Grahame | |
| 4,882,902 A | 11/1989 | Reigel et al. | |
| 5,555,721 A | 9/1996 | Bourneuf et al. | |
| 9,719,363 B2 * | 8/2017 | Pack | F01D 11/008 |
| 2004/0219008 A1 * | 11/2004 | Judet | F01D 5/082 |
| | | | 415/116 |

FOREIGN PATENT DOCUMENTS

EP    2535523    12/2012

OTHER PUBLICATIONS

Extended European Search Report dated Oct. 29, 2015 in European Application No. 15163884.8.

\* cited by examiner

*Primary Examiner* — Eldon Brockman
(74) *Attorney, Agent, or Firm* — Snell & Wilmer, L.L.P.

(57) ABSTRACT

Systems and methods are disclosed herein for distributing cooling air in gas turbine engines. A tangential on board injector ("TOBI") may supply cooling air to a turbine section of a gas turbine engine. The cooling air may be split into a first cooling air path and a second cooling air path. The first cooling air path may fluidly connect the TOBI and the interior of a first stage rotor blade. The second cooling air path may fluidly connect the TOBI and a cavity. The cavity may be located between a first disk and a second disk. The cooling air paths from a single cooling air source may thermally isolate portions of the turbine section.

20 Claims, 4 Drawing Sheets

SYSTEMS AND METHODS FOR DISTRIBUTING COOLING AIR IN GAS TURBINE ENGINES

CROSS-REFERENCE TO RELATED APPLICATIONS

This application is a nonprovisional of, and claims priority to, and the benefit of U.S. Provisional Application No. 62/014,335, entitled "SYSTEMS AND METHODS FOR DISTRIBUTING COOLING AIR IN GAS TURBINE ENGINES," filed on Jun. 19, 2014, which is hereby incorporated by reference in its entirety.

FIELD

The present disclosure relates generally to gas turbine engines. More particularly, the present disclosure relates to cooling air systems in gas turbine engines.

BACKGROUND

Gas turbine engines with multiple turbine stages include interstage seal arrangements between adjacent stages for improved operating efficiency. The interstage seal arrangements confine the flow of hot combustion core gases within an annular path around and between stationary turbine stator blades, nozzles and also around and between adjacent rotor blades.

The interstage seal arrangements may also serve to confine and direct cooling air to cool the turbine disks, the turbine blade roots, and also the interior of the rotor blades themselves as rotor blade cooling facilities higher turbine inlet temperatures, which results in higher thermal efficiency of the engine and higher thrust output. Multiple sources of cooling air may be directed to different portions of the turbine. The multiple sources may result in thermal gradients on the turbine disks and other turbine components.

SUMMARY

A turbine section for a gas turbine engine may comprise a tangential on board injector ("TOBI"), a first stage rotor blade in fluid communication with the TOBI, and a first cavity located between a first disk and a second disk. The first cavity may be in fluid communication with the TOBI.

In various embodiments, the first disk may comprise a disk arm having an orifice. The TOBI and the first cavity may be fluidly connected via the orifice. A segmented seal may be in contact with the first disk and the second disk. The first cavity may be bounded by the first disk, the second disk, and the segmented seal. The second disk may comprise a disk arm having an orifice. A second cavity may be aft of the second disk, and the second cavity may be in fluid communication with the TOBI. The second cavity may be fluidly connected to the TOBI via the orifice in the disk arm of the second disk. The TOBI may be configured to provide a single source of cooling air to the first stage rotor blade, the first disk, and the second disk. The turbine section may further comprise a seal between the first disk and the second disk. The seal may comprise a first radial span, a second radial span, a first axial span that extends between the first radial span and the second radial span, and a second axial span that extends between the first radial span and the second radial span. The first radial span, the second radial span, the first axial span, and the second axial span may form a torque box.

A gas turbine engine may comprise a first cooling air path and a second cooling air path. The first cooling air path may be defined by a cooling air supply source and an interior of a first stage rotor blade. The second cooling air path may be defined by the cooling air supply source, an orifice in a disk arm of a first disk, and a first cavity bounded by the first disk, a second disk, and a seal located between the first disk and the second disk.

In various embodiments, the orifice and the first cavity may be connected via a channel defined by a bore of the first disk and a disk arm of the second disk. The cooling air supply source may comprise a TOBI configured to supply cooling air to the first cooling air path and the second cooling air path. The TOBI may be a single source of the cooling air in the first cooling air path and the second cooling air path. The seal may comprise a segmented seal in contact with the first disk and the second disk.

A method of cooling a turbine section of a gas turbine engine may comprise supplying cooling air to the turbine section, directing a first portion of the cooling air into a rotor blade of a first stage rotor assembly, and directing a second portion of the cooling air into a cavity between a disk of the first stage rotor assembly and a disk of a second stage rotor assembly.

In various embodiments, the first portion of the cooling air and the second portion of the cooling air are supplied by a TOBI. The method may further comprise thermally isolating the disk of the first stage rotor assembly. The second portion of the cooling air may be directed through an orifice in a disk arm of the first stage rotor assembly. The cavity may be defined by the disk of the first stage rotor assembly, the disk of the second stage rotor assembly, and a segmented seal between the disk of the first stage rotor assembly and the disk of the second stage rotor assembly.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures.

DETAILED DESCRIPTION

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

Figure 1:
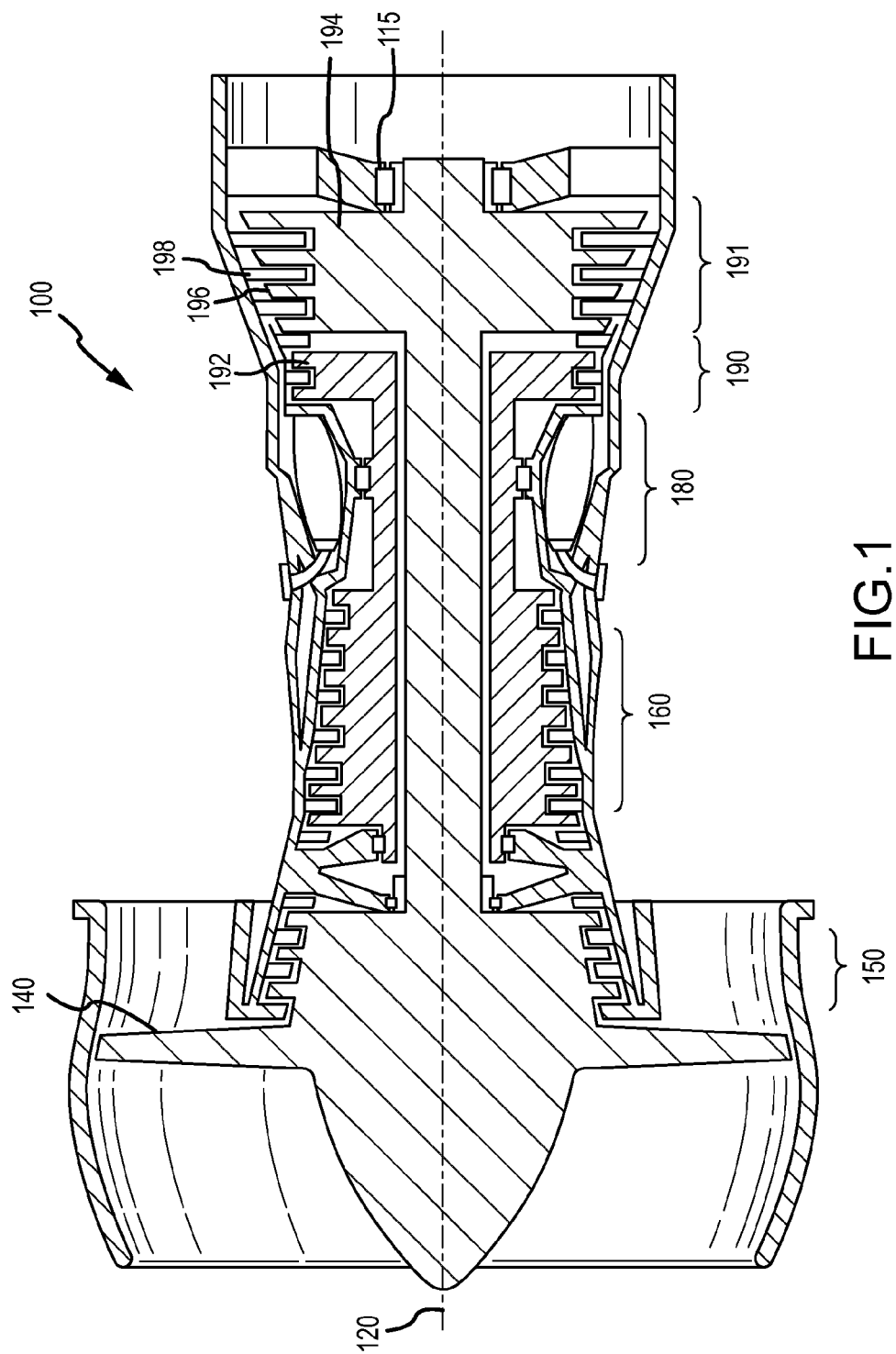
FIG. 1 illustrates a schematic cross-section view of a gas turbine engine in accordance with various embodiments.

Referring to FIG. 1, a gas turbine engine 100 (such as a turbofan gas turbine engine) is illustrated according to various embodiments. Gas turbine engine 100 is disposed about axial centerline axis 120, which may also be referred to as axis of rotation 120. Gas turbine engine 100 may comprise a fan 140, compressor sections 150 and 160, a combustion section 180, and turbine sections 190, 191. Air compressed in the compressor sections 150, 160 may be mixed with fuel and burned in combustion section 180 and expanded across turbine sections 190, 191. Turbine sections 190, 191 may include high pressure rotors 192 and low pressure rotors 194, which rotate in response to the expansion. Turbine sections 190, 191 may comprise alternating rows of rotary airfoils or blades 196 and static airfoils or vanes 198. A plurality of bearings 115 may support spools in the gas turbine engine 100. FIG. 1 provides a general understanding of the sections in a gas turbine engine, and is not intended to limit the disclosure. The present disclosure may extend to all types of turbine engines, including turbofan gas turbine engines and turbojet engines, for all types of applications.

The forward-aft positions of gas turbine engine 100 lie along axis of rotation 120. For example, fan 140 may be referred to as forward of turbine section 190 and turbine section 190 may be referred to as aft of fan 140. Typically, during operation of gas turbine engine 100, air flows from forward to aft, for example, from fan 140 to turbine section 190. As air flows from fan 140 to the more aft components of gas turbine engine 100, axis of rotation 120 may also generally define the direction of the air stream flow.

Figure 2:
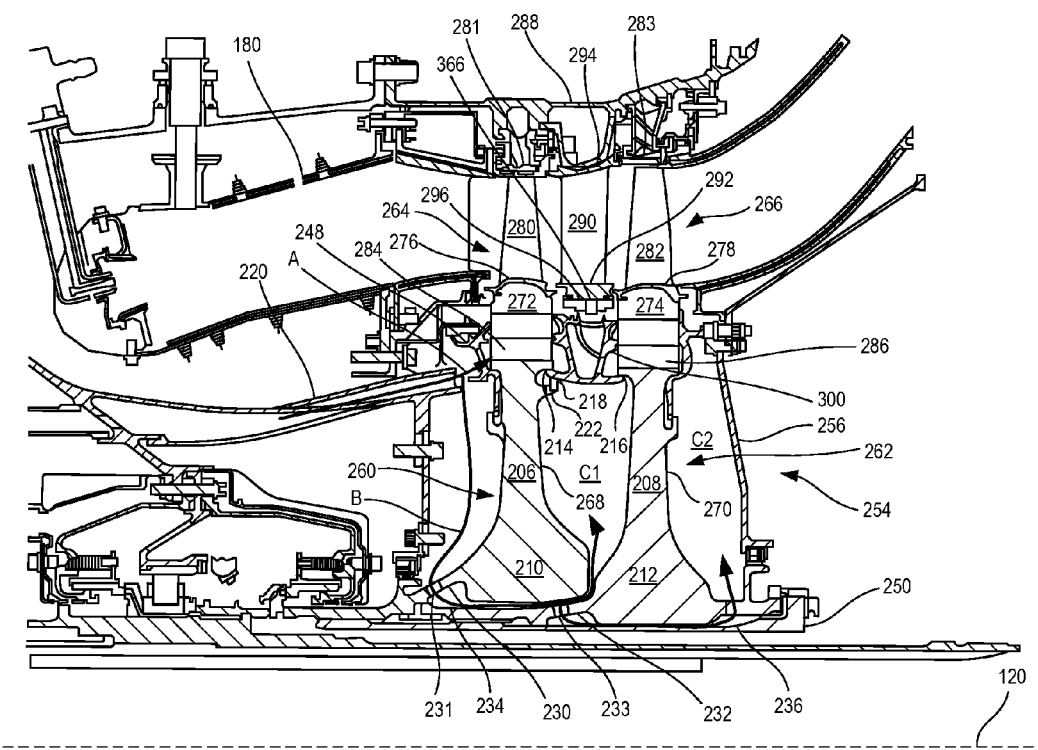
FIG. 2 illustrates a cross-section view of a turbine section of a gas turbine engine in accordance with various embodiments.

Referring to FIG. 2, a cross-section view of a high pressure turbine section ("HPT") 254 of a gas turbine engine is illustrated according to various embodiments. The HPT 254 includes a two-stage turbine section with a first stage rotor assembly 260 and a second stage rotor assembly 262, both of which are affixed to the outer shaft 250.

The rotor assemblies 260, 262 include a respective array of blades 264, 266 circumferentially disposed around a disk 268, 270. Each blade 264, 266 includes a respective root 272, 274, a platform 276, 278 and an airfoil 280, 282. Each disk 268, 270 may comprise a bore 210, 212, a neck 206, 208, a rim 284, 286, and a disk arm 230, 232. Each blade root 272, 274 is received within a respective rim 284, 286 of the disk 268, 270, and the airfoils 280, 282 extend radially outward toward a blade outer air seal (BOAS) assembly 281, 283.

The blades 264, 266 are disposed in the core flow path that is pressurized in the compressor sections, then heated to a working temperature in the combustion section 180. The platforms 276, 278 separate a gas path side inclusive of the airfoil 280, 282 and a non-gas path side inclusive of the root 272, 274.

A shroud assembly 288 within the engine case structure between the blade stages directs the hot gas core airflow in the core flow path from the first stage blades 264 to the second stage blades 266. The shroud assembly 288 may at least partially support the BOAS assemblies 281, 283 and includes an array of vanes 290 that extend between a respective inner vane platform 292 and an outer vane platform 294. The outer vane platforms 294 may be supported by the engine case structure and the inner vane platforms 292 support an abradable annular seal 296 to seal the hot gas core airflow in the axial direction with respect to a segmented interstage seal assembly 300.

The segmented interstage seal assembly 300 includes a plurality of individual seal segments 302 (with reference also to FIG. 3) disposed between the first and second rotor assemblies 260, 262 for sealing between the axially flowing hot gas core airflow and a radially inner first cavity C1 between a respective neck 206, 208 and bore 210, 212 of the disks 268, 270. The multiple seal segments 302 thereby eliminate hoop stress in the segmented interstage seal assembly 300. Each seal segment 302 may be cast of a material such as Inconel® 625 (an austenitic nickel-chromium-based superalloy) or any other suitable material to provide increased knife edge temperature capability. Such materials facilitate reduced transient load variation into the rim 284, 286 by minimization, if not elimination, of the thermally induced growth relative to the disks 268, 270.

Cooling air may be directed to the turbine section via a tangential onboard injector ("TOBI") 220. The TOBI 220 may direct cooling air from the high pressure compressor to the HPT 254. In various embodiments, the cooling air from the TOBI 220 may be injected tangentially, such that the cooling air contains a circumferential velocity. Thus, the direction of the cooling air exiting the TOBI 220 may correspond to the direction of rotation of the first stage HPT blades 264.

In various embodiments, the cooling air from the TOBI 220 may be divided into a blade path A and a cavity path B. An annular seal 248 may divide the cooling air into the blade path A and the cavity path B. The cooling air following the blade path A may enter the first blade 264 and flow into an interior of the airfoil 280 in order to cool the airfoil 280. The cooling air may then exit the blade 264 through film holes in the airfoil 280.

The cooling air following the cavity path B may be directed inward along neck 206 toward the outer shaft 250. A disk arm 230 of the first disk may comprise an orifice 231. The cooling air following the cavity path B may flow through the orifice 231, through a channel 234 between bore 210 and a disk arm 232 of the second disk 270, and into a first cavity C1, defined as the region bounded by the first disk 268, the second disk 270, and the segmented seal assembly 300. In some cases, first cavity C1 may be referred to as the "1-2 cavity."

A disk arm 232 of the second disk 270 may comprise an orifice 233. A portion of the cooling air flowing through the orifice 231 in the first disk may flow through the orifice 233 in the disk arm 232 of the second disk 270. The air flowing though the orifice 233 in the disk arm 232 of the second disk 270 may flow through a channel 236 between bore 212 and outer shaft 250, and into a second cavity C2 located aft of the second disk 270. The second cavity C2 may generally be defined by second disk 270 and an aft wall 256 of HPT 254.

In various embodiments, any suitable component may be in the location of aft wall 256, such as a bearing compartment.

The configuration of the HPT 254 thus fluidly connects the blade 264 of the first stage rotor assembly 260, the first cavity C1, and the second cavity C2 to a single source of cooling air. Thus, the blade 264, the first cavity C1, and the second cavity C2 bay be in fluid communication with one another. In various embodiments, the single source of cooling air may be the TOBI 220. Cooling the blade 264 of the first stage rotor assembly 260, the first cavity C1, and the second cavity C2 from a single source of cooling air may decrease thermal gradients on the disks 268, 270, which may decrease low cycle fatigue and increase the product lifetime of the disks 268, 270. Furthermore, the segmented seal assembly 300 may limit the amount of hot gas entering the first cavity C1, which further thermally isolates the disks 268, 270.

Each seal segment 302 is radially supported on a respective pilot diameter 214, 216 formed by the respective rim 284, 286 of the disk 268, 270. At least one of the individual seal segments 302 includes an anti-rotation tab 218 that interfaces with a stop 222 on the rim 284 of the disk 268. It should be appreciated that various interfaces may be alternatively or additionally provided on one, or multiple, seal segments 302.

Figure 3:
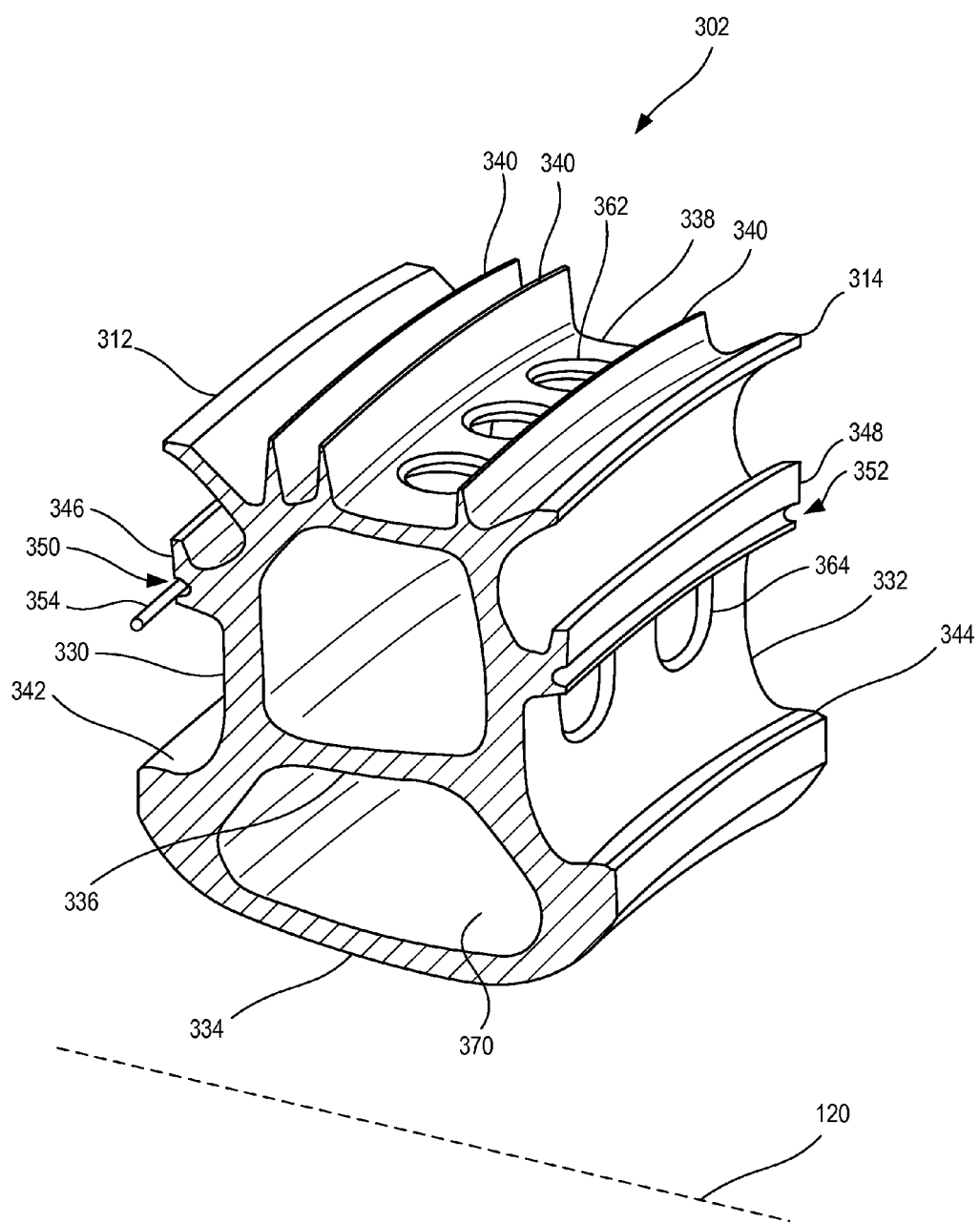
FIG. 3 illustrates a perspective view of a seal in accordance with various embodiments.

Referring to FIGS. 2 and 3, each seal segment 302 generally includes a first radial span 330, a second radial span 332, a first axial span 334, a second axial span 336, and a seal span 338 with a plurality of knife edges 340 that engage the abradable annular seal 296. The first axial span 334, the second axial span 336, and the seal span 338 extend generally axially between the first radial span 330 and the second radial span 332 which extend generally radially with respect to the engine axis 120. It should be appreciated that the first axial span 334, the second axial span 336, and the seal span 338 may include a generally arcuate configuration to facilitate resistance to interstage loads from the first and second rotor assemblies 260, 262.

The first radial span 330 and the second radial span 332 include a respective radial support 342, 344 that engage the respective pilot diameter 214, 216. The first radial span 330 and the second radial span 332 also include a respective axial supports 346, 348 that maintain axial spacing of the segmented interstage seal assembly 300. The axial supports 346, 348 include a circumferential groove 350, 352 to support wire seals 354 that seal with the associated disks 268, 270. The first radial span 330 and the second radial span 332 may further comprise respective pressure seals 312, 314 extending from the junctions between the radial spans 330, 332 and the seal span 338. The pressure seals 312, 314 may contact disks 268, 270. The pressure seals 312, 314, axial supports 346, 348, and radial supports 342, 344 may limit the transfer of hot gas from the core gas path into the first cavity C1.

The seal span 338 and the second radial span 332 include a multiple of apertures 362, 364 that receive and direct a cooling flow from a passage 366 through the vanes 290 into the second stage blade 266. The plurality of apertures 364 in the second radial span 332 may thereby operate similar to a TOBI.

The first radial span 330, the second radial span 332, the first axial span 334, and the second axial span 336 may form a torque box 370 to minimize bending and resist a crushing load between the first and second stage rotor assemblies 260, 262. In other words, shear loads may be transferred to all the sides to improve structural efficiency. The torque box 370 stiffens each seal segment 302 against axial deflection and maintains the disks 268, 270 at a uniform axial displacement. In various embodiments, any number of internal beams with apertures may be located between the axial supports 346, 348 to further strengthen the torque box 370.

The seal segments 302, in combination with the cooling air flow path configurations described herein, may thus provide thermally isolated turbine disks. Although described primarily with respect to a two-stage HPT, the present disclosure may be consistent with HPTs with any number of stages, including a single stage turbine.

Figure 4:
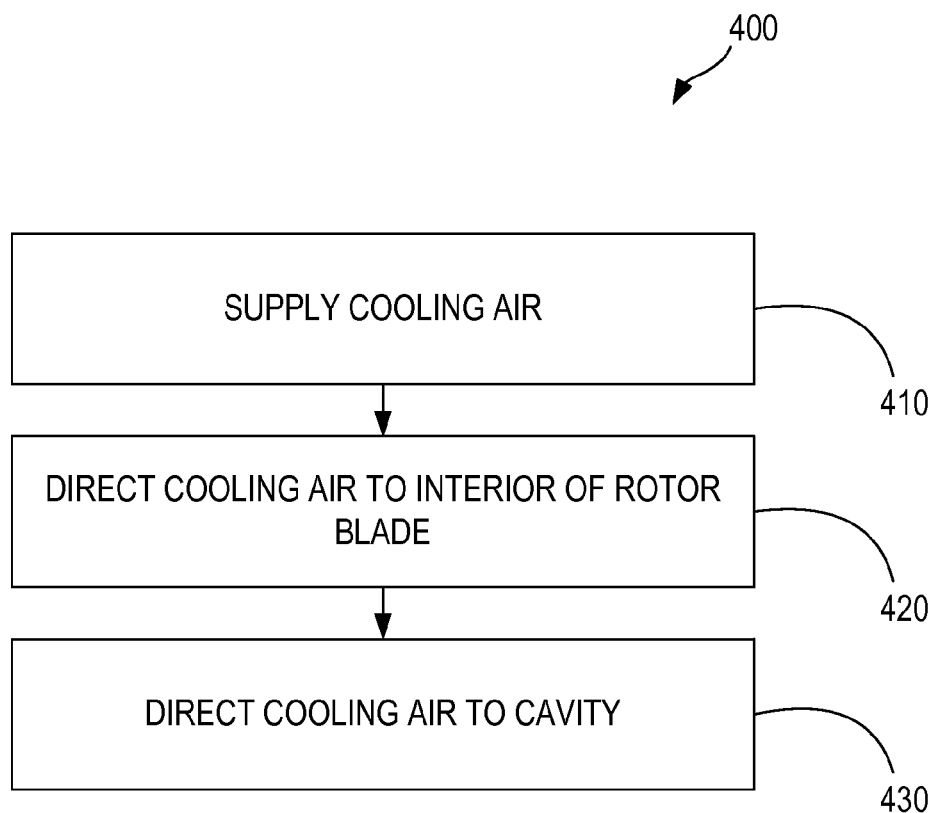
FIG. 4 illustrates a flowchart of a process for cooling a turbine section in accordance with various embodiments.

Referring to FIG. 4, a flowchart of a process 400 for cooling a turbine section of a gas turbine engine is illustrated according to various embodiments. Cooling air may be supplied to the turbine section (step 410). In various embodiments, the cooling air may be supplied by a TOBI. A first portion of the cooling air may be directed into a rotor blade of a first stage rotor assembly (step 420). In various embodiments, an annular seal upstream of the first stage rotor assembly may divide the cooling air into the first portion and a second portion. The second portion of the cooling air may be directed into a cavity between a disk of the first stage rotor assembly and a disk of a second stage rotor assembly (step 430). In various embodiments, the TOBI may be a single source of cooling air for the first portion of the cooling air and the second portion of the cooling air. The second portion of the cooling air may be directed through an orifice in a disk arm of the first stage rotor assembly. The first portion of the cooling air and the second portion of the cooling air may thermally isolate the disk of the first stage rotor assembly.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A turbine section for a gas turbine engine comprising:
   a tangential on board injector ("TOBI");
   a first stage rotor blade in fluid communication with the TOBI;
   a first cavity located between a first disk and a second disk, wherein the first cavity is in fluid communication with the TOBI; and
   a seal between the first disk and the second disk, the seal comprising:
   a first axial span;
   a second axial span;
   a third axial span;
   a first radial span that extends between the first axial span, the second axial span, and the third axial span; and
   a second radial span that extends between the first axial span, the second axial span, and the third axial span,
   wherein the first radial span, the second radial span, the first axial span, and the second axial span at least partially define a torque box,
   wherein the first radial span, the second radial span, the second axial span, and the third axial span at least partially define a radially outward circumferential volume,
   wherein the radially outward circumferential volume is disposed radially outward of the torque box.

2. The turbine section of claim 1, wherein the first disk comprises a disk arm having an orifice.

3. The turbine section of claim 2, wherein the TOBI and the first cavity are fluidly connected via the orifice.

4. The turbine section of claim 3, wherein the first cavity is at least partially bounded by the first disk, the second disk, and the seal.

5. The turbine section of claim 1, wherein the second disk comprises a disk arm having an orifice.

6. The turbine section of claim 5, further comprising a second cavity aft of the second disk, wherein the second cavity is in fluid communication with the TOBI.

7. The turbine section of claim 6, wherein the second cavity is fluidly connected to the TOBI via the orifice.

8. The turbine section of claim 1, wherein the TOBI is configured to provide a single source of cooling air to the first stage rotor blade, the first disk, and the second disk.

9. The turbine section of claim 1, wherein the third axial span comprises a multiple of apertures.

10. The turbine section of claim 1, wherein the second radial span comprises a multiple of apertures.

11. A gas turbine engine comprising:
    a first cooling air path defined by:
    a cooling air supply source; and
    an interior of a first stage rotor blade; and
    a second cooling air path defined by:
    the cooling air supply source;
    an orifice in a disk arm of a first disk; and
    a first cavity bounded by the first disk, a second disk, and a seal located between the first disk and the second disk, the seal comprising:
    a first axial span;
    a second axial span;
    a third axial span;
    a first radial span that extends between the first axial span, the second axial span, and the third axial span; and
    a second radial span that extends between the first axial span, the second axial span, and the third axial span,
    wherein the first radial span, the second radial span, the first axial span, and the second axial span at least partially define a torque box,
    wherein the first radial span, the second radial span, the second axial span, and the third axial span at least partially define a radially outward circumferential volume,
    wherein the radially outward circumferential volume is disposed radially outward of the torque box.

12. The gas turbine engine of claim 11, wherein the orifice and the first cavity are connected via a channel defined by a bore of the first disk and a disk arm of the second disk.

13. The gas turbine engine of claim 11, wherein the cooling air supply source comprises a tangential on board injector ("TOBI") configured to supply cooling air to the first cooling air path and the second cooling air path.

14. The gas turbine engine of claim 11, wherein the first cooling air path and the second cooling air path are configured to thermally isolate the first disk.

15. The gas turbine engine of claim 11, wherein the third axial span comprises a multiple of apertures.

16. The gas turbine engine of claim 11, wherein the second radial span comprises a multiple of apertures.

17. A method of cooling a turbine section of a gas turbine engine comprising:
    supplying cooling air to the turbine section;
    directing a first portion of the cooling air into a rotor blade of a first stage rotor assembly; and
    directing a second portion of the cooling air into a cavity bounded by a disk of the first stage rotor assembly, a disk of a second stage rotor assembly, and a seal between the disk of the first stage rotor assembly and the disk of the second stage rotor assembly, the seal comprising:
    a first axial span;
    a second axial span;
    a third axial span;
    a first radial span that extends between the first axial span, the second axial span, and the third axial span; and
    a second radial span that extends between the first axial span, the second axial span, and the third axial span,
    wherein the first radial span, the second radial span, the first axial span, and the second axial span at least partially define a torque box,
    wherein the first radial span, the second radial span, the second axial span, and the third axial span at least partially define a radially outward circumferential volume, wherein the radially outward circumferential volume is disposed radially outward of the torque box.

18. The method of claim 17, wherein the first portion of the cooling air and the second portion of the cooling air are supplied by a tangential on board injector ("TOBI").

19. The method of claim 17, further comprising thermally isolating the disk of the first stage rotor assembly.

20. The method of claim 17, further comprising directing the second portion of the cooling air through an orifice in a disk arm of the first stage rotor assembly.

\* \* \* \* \*